Figure 1E:
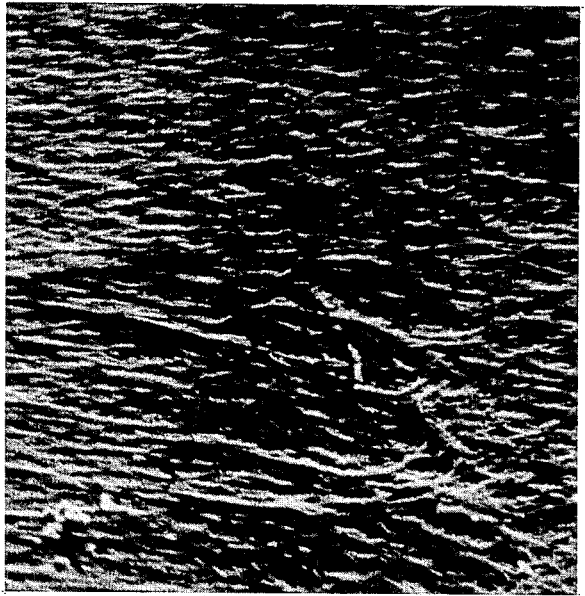

United States Patent [19]

Inoue et al.

[11] 4,177,150

[45] Dec. 4, 1979

[54] DRIED POROUS ACRYLONITRILE POLYMER MEMBRANE, PROCESS FOR PRODUCING SAME AND SEPARATORS MADE THEREFROM

[75] Inventors: Akio Inoue; Tadahiro Kobayashi; Toshio Iwasa, all of Fuji, Japan

[73] Assignee: Asahi Kasei Kogyo Kabushiki Kaisha, Tokyo, Japan

[21] Appl. No.: 831,017

[22] Filed: Sep. 6, 1977

[30] Foreign Application Priority Data

Sep. 8, 1976 [JP] Japan .................................. 51/106613

[51] Int. Cl.² ................................................ B01D 13/04
[52] U.S. Cl. .......................... 210/500 M; 210/321 R
[58] Field of Search .............. 210/500 M, 490, 321 R, 210/321 A, 321 B

[56] References Cited

U.S. PATENT DOCUMENTS

| | | | |
|---|---|---|---|
| 3,615,024 | 10/1971 | Michaels | 210/500 M |
| 4,025,439 | 5/1977 | Kamana et al. | 210/500 M |
| 4,046,843 | 9/1977 | Sano | 210/500 M |

*Primary Examiner*—John Adee
*Attorney, Agent, or Firm*—Sprung, Felfe, Horn, Lynch & Kramer

[57] ABSTRACT

Provided is dried porous membrane composed of acrylonitrile polymer walls separating predominantly interconnecting small-size pores. The membrane has surface layers integrated with a support layer to form a single continuous acrylonitrile polymer phase. At least one of the surface layers has pores of from 0.001 to 0.05 micron in average size, and the support layer has pores which are on the average larger than the pores in the surface layer or layers. The membrane has a porosity of from 20% to 70% by volume and a fragility of below 30. The membrane exhibits improved mechanical properties.

1 Claim, 13 Drawing Figures

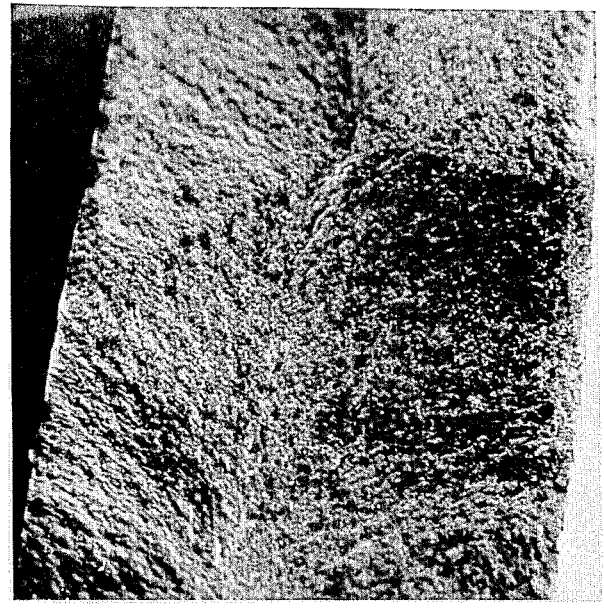
Fig. IA
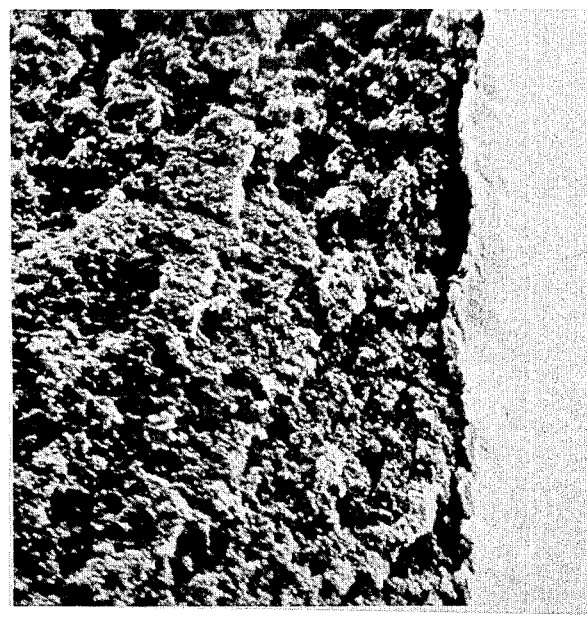
Fig. IB

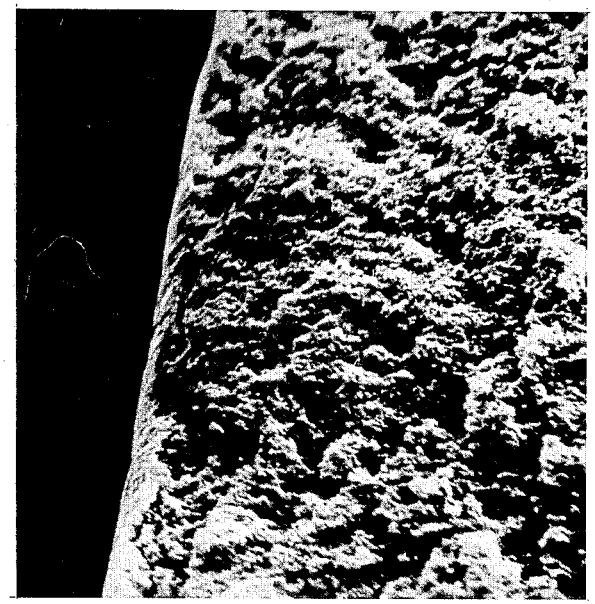
Fig. IC
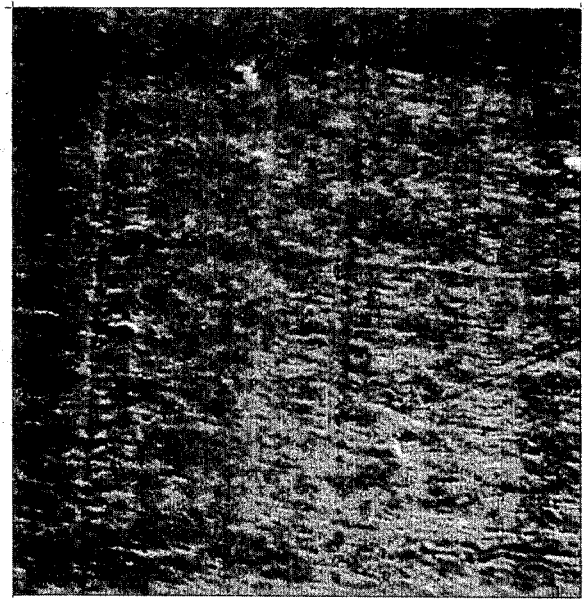
Fig. ID 0 1 2 3 4 5 6 7 μ

0  50  100 μ

DRIED POROUS ACRYLONITRILE POLYMER MEMBRANE, PROCESS FOR PRODUCING SAME AND SEPARATORS MADE THEREFROM

This invention relates to a dried porous acrylonitrile polymer membrane having improved physical or mechanical properties such as flexibility, folding endurance and impact strength. It also relates to a process for producing the acrylonitrile polymer membrane, and further to a separator used in lead storage batteries, which separator is made of the acrylonitrile polymer membrane.

In general, acrylonitrile polymers are poor in thermoplasticity and difficult to thermally shape, and thermally-shaped articles possess extremely poor flexibility and impact strength. On the other hand, acrylonitrile polymer-shaped articles made by a wet procedure, i.e. by coagulating polymer solutions or dispersions, exhibit good flexibility and impact strength in a wet state. However, both flexibility and impact strength become poor when the shaped articles are dried.

Japanese Patent Laid-open Application 90579/1975 discloses the production of a reverse osmosis or ultrafiltration membrane by casting an acrylonitrile polymer solution into a membrane form, immersing the membrane in a non-solvent thereby to remove the solvent, and then, heating the membrane in a wet state at from 50° C. to 90° C. The resulting membrane has interconnecting small-size pores having an average diameter of not larger than 0.5 micron, and the porosity of the membrane is from 0.4 to 0.7. This membrane has a so-called Loeb-Souriajan type asymmetrical cross-sectional structure. That is, one of the surface layers is relatively dense, and the other is relative bulky and sponge-like. Although this membrane exhibits flexibility and tensile strength to some extent, it is not satisfactory particularly in its impact strength and folding endurance.

U.S. Pat. No. 3,615,024 also discloses a reverse osmosis or ultrafiltration membrane of a polymeric material. This membrane comprises one barrier layer at a surface thereof having a plurality of pores from 1 to 1,000 millimicrons in diameter and a support layer integrated with the barrier layer to form a continuous polymer phase, the support layer being of an open porous structure. The polymeric material can be, for example, an acrylonitrile polymer. However, the membrane made of an acrylonitrile polymer is poor in mechanical properties such as impact strength and folding endurance.

A main object of the present invention is to provide a dried porous acrylonitrile polymer membrane of improved mechanical properties such as flexibility, impact strength, folding endurance and tensile strength.

Other objects and advantages of the present invention will be apparent from the following description.

In accordance with the present invention, there is provided a dried porous membrane composed of acrylonitrile polymer walls separating predominantly interconnecting small-size pores, which membrane comprises surface layers integrated with a support layer to form a single continuous acrylonitrile polymer phase. At least one of the surface layers has pores of from 0.001 to 0.05 micron in average size. The support layer has pores with an average size larger than the pores in the surface layer or layers. This membrane has a porosity of from 20% to 70% by volume and a fragility of below 30.

By the term "acrylonitrile polymer" used herein is meant a homopolymer or copolymer of acrylonitrile or its polyblend. The copolymer is comprised of at least 40% by weight, preferably of at least 65% by weight, of units derived from acrylonitrile and not more than 60% by weight, preferably of not more than 35% by weight, of units derived from other copolymerizable monoethylenically unsaturated monomer. Such copolymerizable monomers include, for example, acrylic acid esters such as methyl acrylate, ethyl acrylate, propyl acrylate, butyl acrylate, amyl acrylate, hexyl acrylate, phenyl acrylate and octyl acrylate; methacrylic acid esters such as methyl methacrylate, ethyl methacrylate, propyl methacrylate, butyl methacrylate, amyl methacrylate, hexyl methacrylate, phenyl methacrylate and octyl methacrylate; vinyl or vinylidene halides such as vinyl chloride, vinyl bromide, vinyl fluoride, vinylidene chloride and vinylidene fluoride; vinyl or vinylidene group containing amides such as acrylic amide, methacrylic amide, N-methyl acrylic amide and N-vinylpyrrolidone; vinyl esters such as vinyl acetate, vinyl propionate and vinyl lactate; vinyl group containing aromatic compounds such as styrene and vinylnaphthalene; vinylpyridine; vinyl or vinylidene group containing carboxylic acids such as acrylic acid and methacrylic acid; unsaturated dicarboxylic acids such as itaconic acid, fumaric acid and maleic acid; unsaturated dicarboxylic acid anhydrides such as itaconic anhydride and maleic anhydride; allylsulfonic acid, methallylsulfonic acid and their esters and salts; and olefins such as ethylene and propylene. These copolymerizable monomers may be used alone or in combination. The acrylonitrile polymer may be used either alone or as a polyblend in combination with each other or with other thermoplastic polymers such as nylon, celluloseacetate, polyvinylpyrrolidone and casein. The latter polyblend should preferably comprise at least 40% by weight, based on the weight of the polyblend, of the acrylonitrile units.

Porosity of the membrane is defined by the following equation:

$$\text{Porosity (\%)} = (1 - M/Sg.V) \times 100,$$

wherein M is weight of the membrane, V is volume of the membrane and Sg is specific gravity of the polymer. The porosity of the membrane and the average size of the pores in the surface layer or layers are determined by a mercury intrusion procedure according to ASTM D1940-62T.

By the term "fragility" is meant the degree of the membrane being liable to be broken in half when a strip specimen of the membrane is bent. The fragility of the membrane is determined according to JIS (Japanese Industrial Standard) C2311-1958 by employing the following steps. A strip specimen of 100 millimeters in length and 10 millimeters in width, conditioned at 20° C. and at RH60%, is fixed at its one end, and then bent so that the other end thereof is moved toward the fixed end at a speed of 2 millimeters/second. The distance (D in millimeters) between the two ends of the specimen is measured at the instant the breaking of the specimen commences. The fragility is calculated from the equation as;

$$\text{Fragility} = D/T$$

where T is the thickness of the specimen in millimeters.

The dried porous membranes of the present invention comprises two surface layers integrated with a support layer to form a single continuous acrylonitrile polymer phase. One surface layer or preferably both surface layers are dense and skin-like and characterized by containing pores of a very small size, i.e. from 0.001 to 0.05 micron in average size. The thickness of such a dense surface layer or layers is usually approximately less than ½ of the thickness of the membrane. Particularly, when both surface layers are dense and have pores of from 0.001 to 0.05 micron in average size, the thickness of each surface layer is usually from 0.1 to 20 microns. When one of the surface layers is dense and has pores of from 0.001 to 0.05 micron in average size, the thickness of such a surface layer may usually be varied within the range of from 0.1 micron to ½ of the thickness of the membrane. The support layer contains pores which are larger than the pores of the dense surface layer or layers. Usually, there is a relatively clear boundary between the dense surface layer or layers and the support layer. However, in some cases, there is no clear boundary therebetween because both the size and the number of pores vary continuously in the direction perpendicular to the surfaces of the membrane.

The dried porous acrylonitrile polymer membrane of the invention has a fragility of below 30, and is superior to conventional dried porous acrylonitrile polymer membranes in mechanical properties. It is presumed that such superiority in the mechanical properties of the membrane of the invention is due to the following facts. That is, first, the membrane of the invention is manufactured by a special process, mentioned hereinafter in detail, wherein a coagulated film having a predetermined water content is immersed in hot liquid while a tension is applied to the film in both the longitudinal and transverse directions. Thus, the membrane of the invention exhibits, particularly in its dense surface layer or layers, some orientation in the longitudinal and transverse directions, which fact is proved by an infrared dichroism procedure described, for example, in J. of Macromol. Sci.-Phys., B4(3), pages 491–498 (Sept., 1970). Secondly, the surface layer or layers are composed of not a completely dense, i.e. solid resinous material, but of a porous material having a plurality of extremely small pores. Therefore, a moderate intermolecular attraction force and moderate freedom in the segment motion are ensured in the surface layer or layers. The contribution of the surface layer or layers to the mechanical properties of the membrane is readily proved by the following facts that (1) when the surface layer or layers are sliced off or when the surface layer or layers are dissolved and densified by adding a minor amount of solvent thereto, such mechanical properties, particularly, flexibility and elongation are markedly decrease, and further that (2) when the pore size in the surface layer or layers is increased, the folding endurance is decreased.

The dense surface layer or layers and the supporting layer with the larger pore size can be observed easily by using an electron microscope or an ordinary microscope. The attached figures, FIGS. 1 through 5, are photographs of some typical examples of the membranes of the invention, wherein;

FIG. 1A is a photograph taken by using a scanning-type electron microscope (240×) showing the cross section of a membrane having two dense, skin-like surface layers, FIG. 1B is a photograph taken by using a scanning-type electron microscope (2,400×) showing a portion of the cross section of the membrane shown in FIG. 1, i.e. one dense skin-like surface layer and its proximity.

Figure 2A:
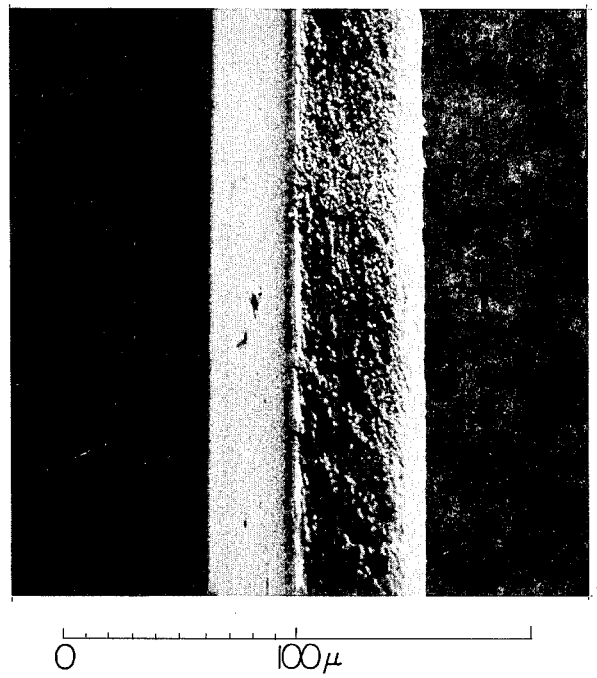
Figure 2B:
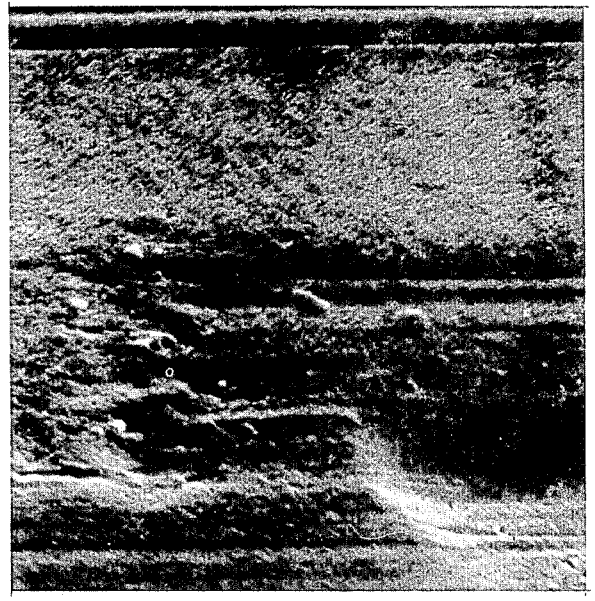
Figure 2C:
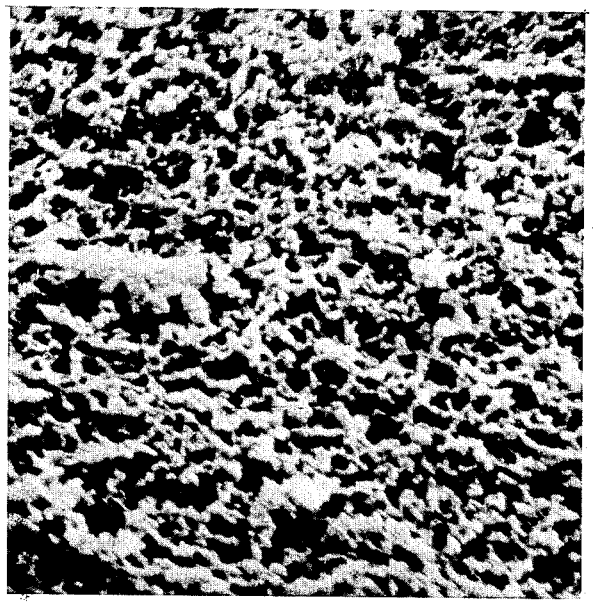
Figure 3:
Figure 4:
Figure 5:
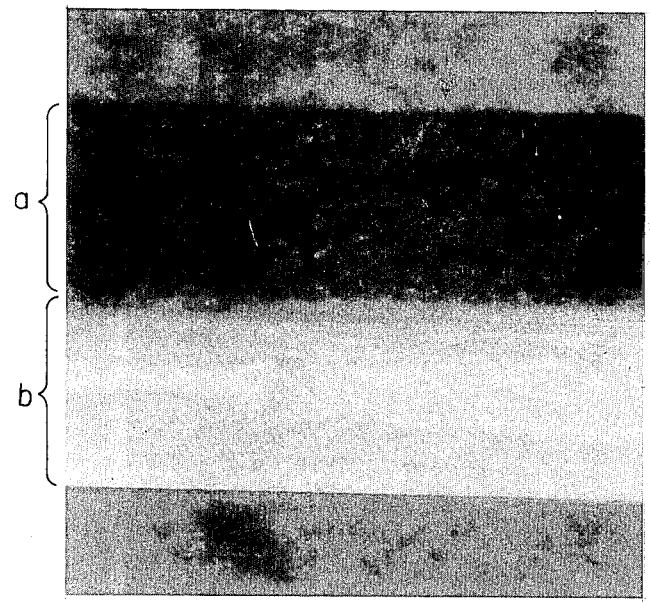

FIG. 1C is a photograph (2,400×) similar to FIG. 1B, showing the other dense skin-like surface layer and its proximity, FIG. 1D is a photograph taken by using a scanning-type electron microscope (8,000×) showing the outer surface of the dense skin-like surface layer showing FIG. 1B, FIG. 1E is a photograph (8,000×) similar to FIG. 1D, showing the outer surface of the dense skin-like surface layer shown in FIG. 1C, FIG. 2A is a photograph taken by using a scanning-type electron microscope (400×) showing the cross section of a membrane having one dense surface layer, FIGS. 2B and 2C are photographs taken by using a scanning-type electron microscope (8,000×) showing the exterior surface of the dense surface layer and the exterior surface of the support layer, respectively, of the membrane shown in FIG. 2A, FIG. 3 is a photograph taken by using a scanning-type electron microscope (400×) showing the cross section of another membrane having one dense surface layer, FIG. 4 is a photograph taken by using an ordinary microscope (120×) showing the cross section of a dyed membrane having two dense skin-like surface layers, and FIG. 5 is a photograph (120×) similar to FIG. 4, of a dyed membrane having one dense surface layer.

The membrane, shown in FIGS. 1A through 1E, which was manufactured by extruding an acrylonitrile polymer solution in nitric acid, has two dense skin-like surface layers each of which is approximately 1 micron in thickness. The membrane shown in FIGS. 2A, 2B and 2C, which was manufactured by casting an acrylonitrile polymer solution in nitric acid followed by coagulation, has one dense layer of approximately 30 microns in thickness. The exterior surface (FIG. 2B) of the dense layer is smooth as compared with the exterior surface (FIG. 2C) of the support layer the membrane. The membrane shown in FIG. 3, which was manufactured by casting the dimethylformamide solution, has one dense layer of approximately 40 to 50 microns in thickness.

The membranes shown in FIGS. 4 and 5 were manufactured by the extrusion and the casting of the acrylonitrile polymer solution in nitric acid, respectively. In these figures, the letters "a" and "b" show a dense surface layer or layers and a support layer, respectively.

The dried membrane of the present invention is prepared by using a process which comprises the steps of:

coagulating an acrylonitrile polymer solution in the form of a film in a way such that at least one surface of the polymer solution film is brought into contact with a coagulation liquid, removing the solvent remaining in the coagulated polymer film;

immersing the film having a water content of from 40 to 300% by weight based on the weight of dry polymer, in a bath of water or an aqueous non-solvent mixture at a temperature of from 70° to 120° C. under conditions satisfying both the following formula (1) and one of the formulae (2), (3) and (4), (1) $-10 \leq S_T, S_Y \leq 0.4$ (2) $0 \leq S_T, S_Y$ and $S_T \times S_Y \leq 0.1$ (3) $0 < S_T \times S_Y$ and $10S_T - 4 \leq S_Y \leq 0.1S_T + 0.4$ (4) $S_T, S_Y < 0$ and $2S_T - 4 \leq S_Y \leq 0.5S_T + 2$ where $S_T$ and $S_Y$ are shrinking or stretching ratio(s) in the longitudinal and transverse directions, respectively; the shrinking or stretching ratio(s) = $(L_0 - L_2)/(L_0 - L_1)$, where $L_0$ = length before immersion, $L_1$ = length when shrunk under relaxed condition, and $L_2$ = length when shrunk or stretched under tension; and, then, drying the film.

The acrylonitrile polymer used preferably possesses a reduced viscosity of from 0.5 to 1.5 as determined at 35° C. in a 0.2% by weight solution in dimethylformamide.

A solvent used for the acrylonitrile polymer solution includes, for example, organic solvents such as dimethylformamide, dimethylacetamide, α-cyanoacetamide, acetonitrile, γ-butyrolactone ethylene carbonate, N-methyl-β-cyanoethylformamide, and dimethylsulfoxide, and concentrated aqueous solutions of inorganic compounds such as nitric acid, sulfuric acid, zinc chloride and sodium thiocyanate.

The polymer solution in these solvents preferably has a concentration of from 7 to 40% by weight. In general, both the pore size and the porosity of the resulting membrane increases with a decrease in the concentration of the polymer solution.

The coagulation liquid used is preferably an aqueous solution containing at most 60% by weight of the solvent used for the polymer solution, or water. With an increase in the concentration of the solvent in the aqueous solution, the pore size in the resulting membrane is increased while porosity thereof is decreased.

The temperatures of the polymer solution and coagulation liquid may be varied usually within the range of from −10° C. to 50° C. With an increase in the temperatures of the polymer solution and coagulation liquid, both the porosity and the pore size tend to increase.

In general, a high polymer concentration in the polymer solution, a high solvent concentration in the coagulation liquid and a low temperature of the coagulation liquid are preferred for the manufacture of the membranes having a surface layer or layers containing pores of below 0.05 micron in size and having improved flexibility and impact strength. For example, when a 70% nitric acid is used as a solvent, it is preferable to employ a polymer solution having a concentration of 14% to 25% by weight and an aqueous nitric acid (coagulation liquid) having a concentration of from 25% to 45% by weight and a temperature of from −10° C. to 10° C.

The polymer dope or solution may be cast on a drum and then dipped in a coagulation liquid. The polymer dope may be extruded directly into a coagulation liquid through, for example, a slit die such as a flat die and a ring die. The extrudate may be of any from such as film, sheet and tube. The tube may possess an inner diameter of about 1 mm to about 100 cm.

For the manufacture of the membrane having two dense surface layers both having pores of 0.0001 to 0.05 micron in average size, it is preferable that the polymer dope extruded in the form of a film be brought into contact with a coagulation liquid at both surfaces. That is, the polymer dope is preferably extruded into a coagulation liquid through a flat slit die or through a ring slit die which has a structure such that a coagulation liquid is introduced into the tubular extrudate.

The coagulated polymer film is then subjected to treatment for the removal of the solvent remaining therein. This treatment may be carried out by washing the polymer film with water, and/or by heat-drying the polymer film, optionally under a reduced pressure. Washing with water is preferable wherein both room temperature water and warm water may be used.

The treated film should have a water content of from 40% to 300% by weight, preferably from 100% to 250% by weight, based on the weight of dry polymer, at the time the film is subjected to the subsequent immersion treatment. When the water content is less than 40% by weight, it is difficult to prepare a membrane having a porosity of at least 20% by volume.

Then, the film having a water content of from 40 to 300% is immersed in a bath of water or an aqueous non-solvent mixture at a temperature of from 70° to 120° C. under tension. The aqueous non-solvent mixture may be comprised of water and, for example, alcohols such as methanol, ethylene glycol, propylene glycol and oligo- or poly-ethylene (or propylene) glycol; acetone; and inorganic salts such as sodium chloride, sodium carbonate, calcium chloride and sodium sulfate.

During the immersion, the film should be under conditions satisfying both the above-mentioned formula (1) and one of the above-mentioned formulae (2), (3) and (4). In the formulae, $S_T$ and $S_Y$ are the shrinking or the stretching ratio (S) in the longitudinal and transverse directions, respectively, which ratio is defined by:

$$S = (L_o - L_2)/(L_o - L_1)$$

where $L_o$ is the length before shrinking or stretching, $L_1$ is the length when shrunk under relaxed condition, and $L_2$ is the length when shrunk or stretched under the conditions actually employed. Plus and minus signs preceding $S_T$ and $S_Y$ means that the film is shrunk and stretched, respectively. $S_Y$ of a tubular film may be calculated from the average length of the circumference of the tubular film.

Among the conditions expressed by the formulae (2), (3) and (4), the condition of formula (2) is preferable. More preferable is the condition of $0 < S_T \leq 0.4$, $0 < S_Y \leq 0.4$ and $S_T S_Y \leq 0.1$. This is due to the following reasons. In general, both the porosity and the pore size are liable to be reduced by the hot liquid immersion treatment. However, the membrane manufactured under such a restricted shrinkage condition exhibits a porosity and a pore size both larger than those of the membrane manufactured while the membrane is stretched or shrunk under a relaxed condition. Furthermore, the membrane manufactured under such a restricted shrinkage condition has far better mechanical properties than those of the membrane manufactured under a relaxed condition.

When the temperature of the water or the aqueous liquid in which the film is immersed is below 70° C., the final dried membrane is liable to be brittle and poor in impact strength.

The water or aqueous non-solvent mixture treatment may be effected as follows. For example, when the film is of a flat sheet form, the film is set on a stationary frame or pin tenter, or on a steel or glass plate. When the film is of a tubular form, water or an aqueous non-solvent mixture, or air or another inert gas is enclosed in the tubular film so that a hydraulic or pneumatic inner pressure is produced therein. Alternatively, a tubular film is forced to slip over the peripheral of a heated mandrel or tube.

Figure 6:
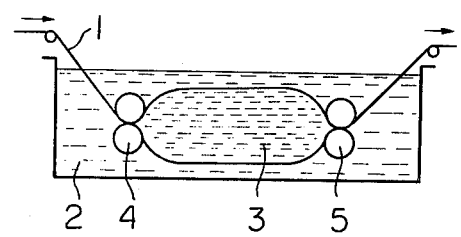

Preferable methods by which the film of a tubular form is subjected to the water or aqueous non-solvent mixture treatment will be illustrated with reference to the attached drawings. In one method, the device shown in FIG. 6 is used. A tubular film 1 is introduced through a pair of feeding nip rollers 4 and a pair of delivery nip rollers 5 disposed horizontally at a certain distance in a bath of hot water or an aqueous non-solvent mixture 2,, and hot water or an aqueous non-solvent mixture 3 is enclosed inside the tubular film 1 between the two pairs of rollers thereby to produce a hydraulic inner pressure therein. Another method involves the use of the device shown in FIG. 7, wherein a pair of feeding nip rollers 4 and a pair of delivery nip rollers 5 are disposed vertically at a certain distance, and hot water or an aqueous non-solvent mixture 3 and air or another inert gas 6 are enclosed inside the tubular film 1 between the two pairs of rollers to produce a hydraulic and pneumatic inner pressure therein. As a modification of the device shown in FIG. 7, a device (not shown in the drawing) having a pair of feeding nip rollers 4 but no delivery nipping rollers 5, i.e. having a suitable support means instead of the delivery nipping rollers 5, may be used. In the method wherein this modified device is employed, a hydrostatic pressure is produced inside the tubular film.

Figure 7:
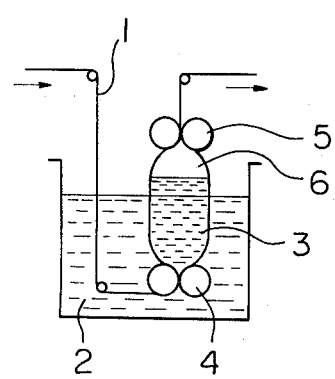

In the methods wherein the devices shown in FIGS. 6 and 7 are used, the extent of stretching or shrinking in the transverse direction of the film 1 may be varied by the amount and temperature of water or the aqueous non-solvent mixture 3 enclosed in the tubular film, by the temperature of the bath 2 and by the adjustment of the distance between two pairs of rollers 4 and 5. The extent of stretching or shrinking in the longitudinal direction of the film 1 may be varied by changing the rotational speed of the two pairs of rollers 4 and 5. The extent of stretching and shrinking in the transverse direction and the extent of stretching and shrinking in the longitudinal direction may be determined independently. Two or more devices disposed in series may be employed, for example, for the purpose of carrying out multi-step stretching. Water or an aqueous non-solvent mixture 3 enclosed in the tubular film may be the same as or different from that of the bath 2. It is preferable that the two liquids have approximately the same specific gravity.

The advantages of the methods wherein the hydraulic pressure of the liquid is produced in the tubular film are stated as follows. First, the tension applied to the film is uniform and the resulting film has uniform thickness and other physical properties. Second, stretching of the film can be effected even at a relatively low temperature. Third, even when the film is stretched, the reduction of porosity is small as compared with the case where the film of a flat sheet form is stretched by using a tenter. Fourth, surface treating agents such as plasticizer, antistatic agent, adhesion or printability improving agent and slip agent can be incorporated in the liquid enclosed in the tubular film.

The period during which the film is immersed in the hot liquid may be suitably determined depending upon the film's thickness and the immersion temperature; that is, the thinner the thickness and the higher the temperature of the film the shorter the period of immersion. For example, a film of 50 microns in thickness may be immersed for several seconds at 100° C. and a film of 300 microns in thickness may be immersed for several minutes at 70° C.

After the immersion in hot liquid, the membrane is dried. (By the term "membrane" used herein is meant a film which has been subjected to the hot liquid immersion treatment.) The drying is preferably carried out at a temperature of below about 80° C. When the membrane is dried at a temperature above about 80° C., even while the membrane is maintained at its original length during the drying, the resulting membrane is somewhat poor in flexibility and impact strength as compared with the membrane dried at below about 80° C. The membrane dried at below about 80° C. exhibits good mechanical properties even when it is again wetted and dried at a temperature of above 80° C., e.g. at 90° C. It is presumed that a wet membrane immediately after the hot liquid immersion is of an unstable structure. However, once the membrane is dried at below about 80° C., the structure thereof becomes stable.

The dried porous acrylonitrile polymer membrane of the present invention has various uses. For example, it is used as a filtration or separation membrane such as a reverse osmosis membrane or an ultrafiltration membrane, as an adsorption membrane such as a chromatography paper or a protein adsorption membrane, as a membrane for supporting a functional liquid, as a membrane for fixing enzyme and as a tracing paper.

The dried membrane is also advantageously used as separators of a lead storage battery, i.e. separators placed between the alternating positive and negative plates in the cells of a lead storage battery. The use of the membrane of the invention as a separator will be described hereinafter.

Acrylonitrile polymers inherently have good resistance to sulfuric acid and are not liable to be oxidized or reduced in sulfuric acid. Therefore, such polymers have been used recently as separators of a lead storage battery. Conventional acrylonitrile polymer separators include, for example, those which are prepared by resin-impregnating treatment or partial melting treatment of a nonwoven fabric sheet from an acrylonitrile polymer fiber alone or in combination with cellulose pulp, or by impregnating a synthetic polymer porous sheet such as polyolefin or polyester with an acrylonitrile polymer solution, followed by coagulation of the polymer solution, removal of the solvent and drying. These separators are advantageous in the following characteristics due to acrylonitrile polymers' inherent properties.

(1) Good affinity to electrolyte and good diffusion of and permeation to electrolyte, (2) Good resistance to oxidation and reduction caused by the electrode reaction in electrolyte (sulfuric acid), and (3) Large electrical resistance. However, separators made of resin-impregnated nonwoven fabrics are poor in uniformity in size of the pores and contain undesirably large-size pores. Separators made of synthetic polymer porous sheet impregnated with an acrylonitrile polymer followed by coagulation are poor in porosity and flexibility.

Separators made of the membranes of the present invention are superior to the conventional separators because of the following characteristics, in addition to the above-mentioned four characteristics.

(4) Good prevention of the active material or electrode reaction product particles from being transmitted through the separator, (5) Good iron permeability, (6) Good mechanical properties such as impact resistance and folding endurance, and good durability, and (7) Thin and capable of providing a compact lightweight and inexpensive battery.

Since the electrodes, particularly the anodes, of a lead storage battery greatly influence the performance of the battery, many proposals have been heretofore made with regard to the anodes. Such proposals include, for example, using, as the active material, a mixture of lead oxide particles different in shape and/or size from each other and the using grids of a hard lead (a lead alloy containing a small amount of antimony) having incorporated therein calcium. These proposed techniques contain the following problem; that is, fine lead oxide particles fallen off from the grids and antimony solubilized by the electrode reaction tend to proceed into separators and after be deposited on the cathodes. These problems lead to a decrease in the insulation resistance of the separators and to shortcircuiting between electrodes. Particularly, the deposit of antimony on the cathodes causes a reduction of hydrogen overvoltage.

The dense surface layer or layers of the membrane of the invention advantageously prevent the fine lead oxide particles and antimony from proceeding therethrough because the pores of the membrane are relatively smalls. The membrane having two dense surface layers is particularly advantageous in this respect.

When an acrylonitrile polymer contains small amounts of a sulfonic acid group or a sulfonate group in the molecule, separators of the membranes made from such acrylonitrile polymer are advantageous in that the separators exhibit a low electrical resistance even at an extremely low temperature. That is, although upon rapid discharge, the capacity and the terminal voltage of a conventional battery rapidly decrease with an decrease of temperature, the capacity and the terminal voltage of the battery having the separators made from the above-mentioned acrylonitrile polymer do not greatly depend on a temperature change. Further the separators made from such a sulfonic acid group or sulfonate group containing acrylonitrile polymer exhibit improved oxidation resistance; thus, the life of the battery is increased.

The sulfonic acid group or sulfonate group containing acrylonitrile polymer may be prepared by copolymerizing acrylonitrile with a monomer containing such a group, such as allylsulfonic acid, methallylsulfonic acid and p-vinylbenzenesulfonic acid, and their salts. The polymer may also be prepared by polymerizing acrylonitrile in the presence of such a sulfonic acid group or sulfonate group containing catalyst such as a combination of a hydroxylaminesulfonic acid salt and ammonium or sodium persulfate or bisulfite, or by sulfonating an acrylonitrile polymer such as an acrylonitrile/styrene copolymer. The amount of the above-mentioned sulfonic acid or sulfonate group in the polymer is preferably 0.05% to 2.0% by weight, in terms of the weight of a sulfonic acid group.

Furthermore, it is preferable that the membrane of the invention be impregnated with a small amount, usually from 0.1 to 10%, more preferably from 0.5 to 5% by weight, of an oil or wax. The oil used may be, for example, petroleum oils such as naphthenic, paraffine and aromatic oils; vegetable oils such as a drying oil, a semi-drying oil or a non-drying oil (e.g. castor oil and olive oil); and silicone oils. The separator made of the oil- or wax-impregnated membrane exhibits an enhanced oxidation resistant period and does not tend to be reduced in mechanical properties, particularly in elongation. The impregnation may be carried out by using known procedures such as coating or dipping. Alternatively, oil or wax may be incorporated in a polymer dope prior to the formation of a membrane therefrom.

The separators of the membrane of the invention may be placed between the alternating positive and negative plates in a corrugated form, in an embossed form or in combination with reinforcing ribs.

The invention is further illustrated by the following examples, in which % and parts are by weight unless otherwise specified. Further, the porosity and fragility of membranes, the pore size of the surface layer or layers and the reduced viscosity of acrylonitrile polymers were assessed by the procedures hereinbefore mentioned. When only one of the two surface layers of the membrane is dense and skin-like, the determination of fragility was carried out by bending the strip specimen so that the dense, skin-like surface layer faces each other. Further, when the membrane exhibited different fragilities depending upon the direction in which the strip specimen was bent, the maximum fragility value was employed unless otherwise specified.

The other physical properties of membranes were assessed as follows. Tensile strength and elongation, and folding endurance were determined according to ASTM D8828 and JIS (Japanese Industrial Standard) P8115, respectively. In the determination of the folding endurance, a load of 50 g and a folding frequency of 60 times/minute was used. Impact strength was determined according to ASTM D781 wherein an impact tester made by TOYO SEIKI MFG. CO. was used. Furthermore, the impact strength was expressed in terms of the strength of a membrane having a thickness of 25 microns.

Electrical resistance and oxidation resistant period of separators made by the membranes were assessed according to JIS C-2313 and C-2311-1958, respectively. In the determination of the oxidation resistant period, anodes made of hard lead containing about 4% by weight of antimony were used.

EXAMPLE 1

A hundred parts of a copoymer comprised of 93% acrylonitrile and 7% methyl acrylate and having a reduced viscosity of 1.40 were dissolved in 500 parts of a 70% nitric acid at −3° C. and then deaerated to prepare a film-forming dope. The dope was extruded through a flat slit die having a 1-millimeter slit and directly into a 30% nitric acid at −3° C. to obtain wet coagulated films each of a 300-micron thickness. After the coagulated films were washed with water at room temperature for removing the solvent, the films having a water content of 220% were immersed in hot water. During immersion, shrinkage of the films was restricted to a certain extent by setting the films in wooden frames. Finally, the membranes were dried. The conditions under which the films were subjected to the hot water immersion treatment and the drying treatment are shown in Table I below. The obtained dried membranes were opaque, although they became clear when they were soaked with water. The membranes were each comprised of two dense skin-like surface layers each having a thickness of about one micron and a bulky sponge-like inner support layer. Characteristics of the membranes are shown in Table I below.

Table I

| Run No. *1 | Hot water immersion Temperature (°C.) | Free Shrinkage (%) *2 | Restricted shrinkage (%) *2 | $S_T = S_Y$ | $S_T \times S_Y$ | Drying Shrinkage *3 | Temperature (°C.) | Tensile strength (kg/mm²) | Tensile elongation (%) | Impact strength (kg-cm) | Folding endurance (times) | Porosity (%) | Surface pore size (micron) | Fragility |
|---|---|---|---|---|---|---|---|---|---|---|---|---|---|---|
| 1 | 98 | 34 | 7 | 0.20 | 0.04 | C | 70 | 2.4 | 22 | 2.1 | 36 | 42 | 0.011 | 0 |
| 2 | 98 | 34 | 7 | 0.20 | 0.04 | F | 70 | 2.6 | 25 | 1.7 | 24 | 39 | 0.010 | 0 |
| 3 | 85 | 30 | 6 | 0.20 | 0.04 | C | 70 | 2.3 | 20 | 2.3 | 47 | 40 | 0.011 | 0 |
| 4 | 85 | 30 | 7 | 0.24 | 0.06 | C | 70 | 2.0 | 17 | 2.0 | 40 | 36 | 0.009 | 0 |
| 5 | 85 | 30 | 9 | 0.30 | 0.09 | C | 70 | 2.0 | 18 | 2.0 | 29 | 32 | 0.009 | 0 |
| 6 | 75 | 26 | 5 | 0.19 | 0.04 | C | 70 | 2.1 | 21 | 2.5 | 51 | 36 | 0.009 | 0 |
| 7 | 98 | 34 | 7 | 0.20 | 0.04 | C | 90 | 1.9 | 14 | 1.5 | 20 | 40 | 0.010 | 0 |
| 8 | 98 | 34 | 14 | 0.41 | 0.17 | C | 70 | 1.8 | 10 | 1.2 | 13 | 18 | <0.008 | 0 |
| 9 | 85 | 30 | 12 | 0.40 | 0.16 | C | 70 | 1.9 | 14 | 1.4 | 15 | 19 | <0.008 | 0 |
| 10 | 65 | 19 | 4 | 0.21 | 0.04 | C | 70 | 1.3 | 6 | 0.9 | 8 | 15 | <0.008 | 0 |
| 11 | 65 | 19 | 0 | 0.00 | 0.00 | C | 70 | 1.6 | 8 | 1.3 | 12 | 18 | <0.008 | 0 |
| 12 | 85 | 30 | 30 | 1.00 | 1.00 | F | 70 | 1.4 | 1 | 0.1 | 1 | 8 | <0.008 | 52 |

Notes:
*1 Run Nos. 8, 9, 10, 11 and 12 are comparative examples.
*2 Free shrinkage = $100 \times (L_0-L_2)/L$
Restricted shrinkage = $100 \times (L_0-L_2)/L_0$ where $L_0$, $L_1$ and $L_2$ are the same as hereinbefore defined.
*3 C means that the membrane was dried while it was maintained at its original length;
F means that the membrane was dried while its free shrinkage was permitted, i.e. under a relaxed condition.

EXAMPLE 2

A film-forming dope similar to that prepared in Example 1 was cast at a thickness of 500 microns on glass plates, and then immersed in a coagulation bath similar to that used in Example 1, to obtain coagulated films each approximately 300 microns in thickness. The coagulated films were washed with room-temperature water. The washed films having a water content of 210% were immersed in hot water and then dried, in manners similar to those in Example 1, wherein the final drying was carried out at 70° C. while the films were maintained at their original length.

Each of the obtained dried membranes was comprised of a dense surface layer having a thickness of 30 microns and a support layer. Characteristics of the membranes of Example 2 are shown in Table II below.

EXAMPLE 3

Following the procedure set forth in Example 1, the resultant dried membranes were prepared wherein the hot water immersion was carried out at 85° C. for three minutes. The amount of free shrinkage at 85° C. was '30%. Furthermore, drying of the membranes was carried out under relaxed condition. Results are shown in Table III below. The average pore size of the surface layers of the membranes was less than 0.01 micron.

Table III

| Run No. *1 | Hot water immersion Restricted shrinkage (%) *2 A | B | $S_T$ | $S_Y$ | $S_I \times S_Y$ | Drying temperaure (°C.) | Properties of membranes Tensile strength (kg/mm²) *2 A | B | Impact strength (kg-cm) | Folding endurance (times) *2 A | B | Porosity (%) | Fragility |
|---|---|---|---|---|---|---|---|---|---|---|---|---|---|
| 1 | 0 | 0 | 0.00 | 0.00 | 0.00 | 70 | 2.5 | 2.4 | 2.4 | 56 | 53 | 43 | 0 |
| 2 | 3 | 9 | 0.1 | 0.3 | 0.03 | 70 | 2.6 | 2.2 | 2.1 | 51 | 40 | 39 | 0 |
| 3 | 6 | 12 | 0.2 | 0.4 | 0.08 | 70 | 2.2 | 1.9 | 1.9 | 44 | 31 | 32 | 0 |
| 4 | 0 | 0 | 0.00 | 0.00 | 0.00 | 25 | 2.3 | 2.3 | 2.8 | 63 | 60 | 45 | 0 |
| 5 | 0 | 0 | 0.00 | 0.00 | 0.00 | 90 | 2.7 | 2.6 | 1.8 | 38 | 29 | 40 | 0 |
| 6 | 9 | 15 | 0.3 | 0.5 | 0.15 | 70 | 2.0 | 1.1 | 0.6 | 31 | 4 | 17 | 0 |

Notes: *1 Run No. 6 is a comparative example.
*2 A and B represent a longitudinal direction and a transverse direction, respectively.

EXAMPLE 4

Following the procedure set forth in Example 1, coagulated films were prepared. After the coagulated films were washed with water at room temperature, the films were immersed in hot water of 98° C. under the conditions shown in Table IV below, wherein shrinking and stretching conditions were varied by using a tenter Table II

| Run No. *1 | Hot water immersion Temperature (°C.) | Free Shrinkage (%) | Restricted Shrinkage (%) | $S_T = S_Y$ | $S_T \times S_Y$ | Properties of membranes Tensile strength (kg/mm²) | Tensile Elongation (%) | Impact strength (kg-cm) | Folding endurance (times) | Porosity (%) | Surface pore size (micron) | Fragility |
|---|---|---|---|---|---|---|---|---|---|---|---|---|
| 1 | 98 | 35 | 7 | 0.20 | 0.04 | 1.9 | 13 | 0.9 | 8 | 39 | <0.008 | 0 |
| 2 | 85 | 33 | 7 | 0.21 | 0.04 | 1.8 | 11 | 0.8 | 6 | 39 | <0.008 | 0 |
| 3 | 75 | 29 | 6 | 0.21 | 0.04 | 1.8 | 10 | 0.6 | 5 | 33 | <0.008 | 0 |
| 4 | 65 | 24 | 5 | 0.21 | 0.04 | 1.2 | 4 | 0.4 | 2 | 14 | <0.008 | 38 |
| 5 | 75 | 29 | 29 | 1.0 | 1.0 | 0.7 | 1 | 0.1 | 1 | 8 | <0.008 | 61 |

Notes: *1 Run Nos. 4 and 5 are comparative examples.

stretcher. The films contained 220% of water before the hot water immersion treatment. The films exhibited a shrinkage of 34% in the hot water of 98° C. when relaxed. After the hot water immersion treatment, the films were dried at 70° C. under a relaxed condition.

Results are shown in Table IV below. The obtained dried membranes had two dense skin-like surface layers each having a thickness of 0.5 to 2.0 microns. The membranes exhibited a fragility of zero.

Table IV

| Run No. *1 | Hot water immersion Shrinkage % | | $S_T$ | $S_Y$ | $10S_T - 4$ or $2S_T - 4$ | $0.1S_T + 0.4$ or $0.5S_I + 2$ | Tensile strength (kg/mm²) | | Folding endurance (times) | | Impact strength (kg-cm) | Porosity (%) |
|---|---|---|---|---|---|---|---|---|---|---|---|---|
| | A | B | | | | | A | B | A | B | | |
| 1 | 7 | −34 | 0.2 | −1 | −2 | 0.42 | 1.7 | 2.4 | 26 | 47 | 1.6 | 38 |
| 2 | 7 | −100 | 0.2 | −3 | −2 | 0.42 | 1.6 | 2.6 | 11 | 43 | 0.9 | 18 |
| 3 | 0 | −100 | 0 | −3 | −4 | 0.4 | 1.8 | 2.6 | 19 | 44 | 1.3 | 27 |
| 4 | 0 | −170 | 0 | −5 | −4 | 0.4 | 1.5 | 2.7 | 8 | 38 | 0.6 | 18 |
| 5 | −34 | −170 | −1 | −5 | −6 | 1.5 | 1.7 | 2.6 | 13 | 28 | 1.4 | 26 |
| 6 | −34 | −270 | −1 | −8 | −6 | 1.5 | 1.4 | 2.7 | 5 | 21 | 0.4 | 16 |
| 7 | −200 | −200 | −6 | −6 | −16 | −1 | 2.1 | 2.2 | 22 | 27 | 1.9 | 25 |
| 8 | −200 | −400 | −6 | −12 | −16 | −1 | 1.6 | 2.6 | 4 | 18 | 0.8 | 16 |

Note: *1 Run Nos. 2, 4, 6 and 8 are comparative examples.

EXAMPLE 5

A hundred parts of a copolymer comprised of 90% acrylonitrile, 6% acrylic amide and 4% methyl acrylate and having a reduced viscosity of 1.45 were dissolved in 500 parts of a 70% nitric acid at −3° C. and then deaerated to prepare a film-forming dope. The dope was extruded at −3° C. into a coagulation bath through a nozzle of a double-tube structure provided with concentrically-disposed inner and outer tubes, the inner tube having an inner diameter of 1.8 mm and an outer diameter of 3.0 mm, and the outer tube having an inner diameter of 4.0 mm. That is, the dope was extruded through an annular orifice between the inner and outer tubes of the nozzle while a coagulation liquid was fed through the inner tube into the tube-form extrudate. The extrusion rate was 6.8 ml/min. Both the coagulation liquid and the coagulation bath were each comprised of a 25% nitric acid having a temperature of 0° C. The coagulated extrudate was in a tubular form having an outer diameter of 4.1 mm and an inner diameter of 3.5 mm. The tubular extrudate was washed with water at room temperature for removing the solvent, and then cut into 80 cm lengths. Fifty tubes each 80 cm in length having a water content of 240% were made up into a bundle. Both ends of the bundle were bonded with an epoxy resin to obtain a module. The module was immersed in 95° C. hot water for three minutes while the length of the module was maintained at constant and a hydraulic pressure of about 70 mmHg was applied to the module. After being quenched with water, the module was dried in air. The resultant module had an outer diameter of 3.8 mm and an inner diameter of 3.4 mm, and exhibited flexibility. The module also exhibited a similar degree of flexibility even after wetting and drying of the module were repeated.

For comparison purposes, a module obtained in a manner similar to the above was immersed in hot water, quenched with cold water and then air-dried, by following a procedure similar to the above-described procedure wherein the hot water immersion was carried out without applying any additional hydraulic pressure to the module. The resultant module had an outer diameter of 3.2 mm and an inner diameter of 2.7 mm. In addition, the module was very brittle, liable to easy splitting and not flexible.

Properties of the membranes of the modules of this example and the comparative example are as follows.

| | Example | Comparative example |
|---|---|---|
| Thickness of surface layer (microns) | | |
| Outer | 2 | 2 |
| Inner | 4 | 3 |
| Surface pore size (microns) | | |
| Outer and Inner | below 0.01 | below 0.01 |
| Fragility | 0 | 46 |
| Porosity (%) | 41 | 26 |

EXAMPLE 6

A hundred parts of a copolymer comprised of 93% acrylonitrile and 7% methyl acrylate and having a reduced viscosity of 1.45 were dissolved in 560 parts of a 70% nitric acid at −3° C. and then deaerated to prepare a film-forming dope. The dope was extruded through a ring slit die into a coagulation bath maintained at −5° C. The die had an annular slit of a 1.0 -mm clearance and a 35 -mm diameter through which the dope was extruded. Furthermore, the ring slit die had two pipes, through one of which a coagulation liquid was forced to be introduced into the tubular extrudate and through the other of which the coagulated liquid was withdrawn therefrom. The extrusion rate was 450 ml/min. Both the coagulation bath and the coagulation liquid were each comprised of a 36% nitric acid having a temperature of −5° C. The tubular extrudate was withdrawn at a speed of 5 m/min. by passing it through a pair of pinch rollers. The coagulated extrudate had a thickness of 400 microns and was in the form of a flattened tube having a width of 60 mm.

The tube was washed with water at room temperature for removing the solvent therefrom. Then, the washed tube having a water content of 220% was immersed in a bath of 90° C. hot water while the tube was being stretched. The stretcher used was of an inflation type having two pairs of nip rollers disposed in the hot water bath as shown in the hot water bath as shown in FIG. 6. The stretching was effected firstly by introducing the tube through the two pairs of rollers disposed with a distance of 4.0 m in between while a certain amount of 90° C. hot water was introduced in to the tube, secondly by nipping the tube at the respective roller nips, thirdly, by shortening the distance between the two pairs of rollers up to 1.0 m to heighten the inner pressure of the tube while the tube was being transferred by rotating the two pairs of rollers at 5 m/min., fourthly, by increasing the rotational speed of only the delivery rollers up to 15 m/min., and then, continuing the rotations of the lead-in rollers and the delivery rollers at rates of 5 m/min. and 15 m/min., respectively. Thus, the tube was biaxially and simultaneously stretched three times its original length in the longitudinal direction and two times its original length in the transverse direction. The stretched tubular film was cut in the longitudinal direction and spread out. Then, the membrane so-produced was dried at room temperature.

The obtained membrane was proved to have been extremely uniformly stretched by observing checkered lines drawn thereon prior to stretching of the tubular film. The thickness of the film was also extremely uniform. Characteristics of the resultant membrane are as follows.

the films were air-dried at room temperature while being maintained at their original lengths both in the longitudinal and transverse directions, in order to prepare five dried films having water contents of 200%; 140%; 100%; 60%; and 30% by weight, respectively, based on their dry weights. These films were immersed in 95° C. hot water for two minutes while being maintained at their original lengths, and then air-dried. In Run No. 7, the hot water immersion was carried out while the film having a water content of 200% was shrunk under a relaxed condition.

The obtained dried membranes were comprised of two dense skin-like surface layers and a bulky sponge-like inner support layer. Characteristics of these membranes are shown in Table V below. The average pore size of the surface layers of these membranes was below 0.01 micron.

Table V

| Run No. *1 | Water content after drying (%) | Thickness (microns) | Impact strength (kg-cm) | Folding endurance (times) | Cross section *2 | Porosity (%) | Thickness of surface layers (micron) | Fragility | Electrical resistance ($\Omega dm^2$/membrane) | Oxidation resistant period (hr) |
|---|---|---|---|---|---|---|---|---|---|---|
| 1 | 200 | 86 | 1.5 | 38 | A | 42 | 0.8 | 0 | $3.5 \times 10^{-4}$ | more than 48 |
| 2 | 140 | 77 | 1.3 | 33 | A | 33 | 2 | 0 | $2.9 \times 10^{-4}$ | more than 48 |
| 3 | 100 | 68 | 1.3 | 30 | A | 25 | 15 | 0 | $4.8 \times 10^{-4}$ | more than 48 |
| 4 | 60 | 65 | 1.1 | 24 | A | 21 | 20 | 0 | $8.9 \times 10^{-4}$ | more than 48 |
| 5 | 30 | 55 | 0.8 | 20 | B | 12 | — | 0 | $8.3 \times 10^{-3}$ | more than 48 |
| 6 | Kraft pulp | 800 | — | — | — | — | — | 21 | $1.9 \times 10^{-3}$ | — |
| 7 | 200 | 108 | 0.2 | 1 | A | 17 | 1 | 58 | $1.0 \times 10^{-2}$ | more than 48 |

Notes: *1 Run Nos. 5, 6 and 7 are comparative examples
*2 A: Clear tripple-layer structure
B: Little or no clear tripple-layer structure

| Tensile strength | A | 2.4 kg/mm² |
| | B | 2.1 kg/mm² |
| Tensile elongation | A | 18% |
| | B | 16% |
| Impact strength | | 2.8 kg-cm |
| Folding endurance | A | 48 times |
| | B | 41 times |
| Surface pore size | | 0.009 microns |
| Porosity | | 43% |
| Thickness of each surface layer | | about 1 micron |
| Fragility | | 0 |

EXAMPLE 7

A hundred parts of a copolymer comprised of 93% acrylonitrile and 7% vinyl acetate and having a reduced viscosity of 1.35 were dissolved in 500 parts of a 70% nitric acid and then deaerated to prepare a film-forming dope. The dope was extruded through a flat slit die having a 1 mm slit and into a 30% nitric acid at 0° C. to obtain wet coagulated films each of a 150 micron thickness. After the coagulated films were washed with water at room temperature for removing the solvent, The tensile strengths of the membrane in Run Nos. 1 through 5 were between 2.1 and 2.4 kg/mm².

EXAMPLE 8

In a manner similar to that described in Example 7, wet coagulated films each approximately 640 microns in thickness were obtained separately from three acrylonitrile/methyl acrylate copolymers containing 9%; 25% and 36% of methyl acrylate, respectively. The reduced viscosity of each copolymer was 1.25. The polymer concentration of each dope was 20%.

After the coagulated films were washed with water at room temperature, the films having a water content of 210% were stretched in 95° C. hot water to twice their original lengths both in the longitudinal and transverse directions, and then air-dried. The dried membranes were about 70 microns in thickness, comprised of two dense skin-like surface layers and a sponge-like porous inner support layer. Characteristics of these membranes are shown in Table VI below. The surface pore size of the membranes was below 0.01 micron. The fragility of each membrane was zero.

Table VI

| Run No. | Methyl acrylate content in copolymer (%) | Tensile strength (kg/mm²) | Tensile elongation (%) | Impact strength (kg-cm) | Folding endurance (times) | Porosity (%) | Surface pore size (micron) | Electrical resistance ($\Omega dm^2$/membrane) | oxidation resistant period (hr) |
|---|---|---|---|---|---|---|---|---|---|
| 1 | 9 | 2.8 | 18 | 2.2 | 36 | 31 | <0.008 | $2.4 \times 10^{-4}$ | More than 48 |
| 2 | 25 | 2.7 | 21 | 2.6 | 30 | 29 | <0.008 | $4.9 \times 10^{-4}$ | " |

Table VI-continued

| Run No. | Methyl acrylate content in copolymer (%) | Tensile strength (kg/mm²) | Tensile elongation (%) | Impact strength (kg-cm) | Folding endurance (times) | Porosity (%) | Surface pore size (micron) | Electrical resistance (Ωdm²/membrane) | oxidation resistant period (hr) |
|---|---|---|---|---|---|---|---|---|---|
| 3 | 36 | 2.9 | 19 | 2.3 | 28 | 23 | <0.008 | $9.1 \times 10^{-4}$ | " |

EXAMPLE 9

A copolymer comprised of 92% acrylonitrile and 8% methyl acrylate and having a molecular weight of 74,000, and 10% by weight, based on the weight of the copolymer, of liquid paraffin was dissolved at 0° C. in a 70% nitric acid and then deaerated to prepare dopes. Each dope was spread on a glass plate at a coating thickness of 500 microns by using a doctor knife. Thereafter, the dope was immediately immersed in a coagulation bath containing 35% nitric acid and then removed from the glass plate to obtain coagulated films each having a thickness of between 260 and 310 microns. The coagulated films were washed with water at room temperature, immersed in 90° C. hot water for about three minutes while being maintained at their original lengths both in the longitudinal and transverse directions, and finally air-dried. The dried membranes so manufactured had a double-layer structure having a thickness of between 160 and 190 microns, comprised of a dense skin-like surface layer and a sponge-like porous support layer. Characteristics of the membranes are shown in Table VII below. The electrical resistance for each membrane varied from $1\times10^{-4}$ to $4\times10^{-4}$ Ωdm² and the oxidation resistant periods were each more than 48 hours. In the determination of the oxidation resistant period, anodes made of hard lead containing about 4% by weight of antimony were used. The thickness of the surface layer of each membrane was less than 50 microns.

Membrane of Frun No. 3 was impregnated with a mixture of naphthenic process oil ("R-200" supplied by KYODO SEKIYU CO.) and petroleum ether. Thereafter, the electrical resistance and the oxidation resistant period for each specimen were tested. Results were as follows.

| Amounts (%) | | Electrical resistance (Ωdm²/membrane) | Oxidation resistant period (hr) |
|---|---|---|---|
| Process oil | Petroleum ether | | |
| — | — | $2 \times 10^{-4}$ | 56 |
| 0.1 | 0.3 | $2 \times 10^{-4}$ | 92 |
| 1 | 2 | $2 \times 10^{-4}$ | 131 |
| 3 | 4 | $4 \times 10^{-4}$ | 141 |
| 10 | 13 | $45 \times 10^{-4}$ | 168 |

EXAMPLE 10

A monomer mixture of acrylonitrile, methyl acrylate and sodium methallylsulfonate was polymerized in the presence of azobisisobutyronitrile (polymerization catalyst) by a suspension polymerization procedure under the following conditions.

| | |
|---|---|
| Water/total monomer ratio: | 4/1 |
| Amount of catalyst: | 0.5% based on the weight of total monomer |
| Polymerization temperature: | 60° C. |
| Polymerization period: | 4 hours |

In a manner similar to that described in Example 8, dried membranes were manufactured from the polymers prepared by the above-mentioned suspension polymerization wherein the polymer concentration in the dope was 16% and the coagulation bath temperature was 0° C. Furthermore, the hot water immersion was carried out at 100° C. for two minutes.

The dried membranes were comprised of a dense skin-like surface layer and a sponge-like support layer. The thickness of each surface layer was less than 50 microns. Characteristics of the membranes are shown in Table VIII below. The average pore size in the dense skin-like surface layer was approximately between 0.008 and 0.010 micron. The fragility was zero.

Table VII

| | Membrane-making conditions | | | Properties of membrane | | | | | | | |
|---|---|---|---|---|---|---|---|---|---|---|---|
| Run No. *1 | Polymer conc. in dope (%) | Coagulation bath concentration (%) | Coagulation bath temperature (°C.) | Surface pore size (micron) | Porosity (%) | Tensile strength (kg/mm²) | Tensile elongation (%) | Impact strength (kg-cm) | Folding endurance (times) | Fragility | separator Sb content in membrane (ppm) *2 |
| 1 | 18 | 40 | −3 | 0.013 | 27 | 1.8 | 18 | 1.4 | 8 | 0 | Below 0.1 |
| 2 | 18 | 10 | 0 | 0.034 | 32 | 1.6 | 16 | 1.5 | 6 | 0 | " |
| 3 | 16 | 40 | −3 | 0.014 | 44 | 1.9 | 16 | 1.6 | 6 | 0 | " |
| 4 | 16 | 50 | −3 | 0.011 | 41 | 1.5 | 13 | 1.4 | 7 | 0 | " |
| 5 | 16 | 20 | 0 | 0.036 | 38 | 1.5 | 11 | 1.2 | 4 | 0 | 0.2 |
| 6 | 14 | 45 | −3 | 0.010 | 40 | 1.7 | 14 | 1.4 | 5 | 0 | Below 0.1 |
| 7 | 14 | 25 | 0 | 0.035 | 45 | 1.4 | 11 | 1.0 | 3 | 0 | 0.4 |
| 8 | 16 | 10 | 5 | 0.068 | 47 | 1.0 | 8 | 0.5 | 1 | 8 | 6 |
| 9 | 14 | 15 | 5 | 0.083 | 48 | 0.8 | 7 | 0.3 | 1 | 16 | 9 |

Note: *1 Run Nos. 8 and 9 are comparative examples
*2 Content of antimony in membrane was determined for each specimen by atomic-absorption spectroscopy after 48 hours had elapsed from the commencement of the charge.

Table VIII

| Run No. | Composition of monomer mixture *1 AN | MA | SM | Content of sulfonic acid group (%) *2 | Properties of membrane Porosity (%) | Properties of separator Electrical resistance (Ωdm²/100 micron) 20° C. | −15° C. | Insulation resistance at 20° C. (Ω. cm) |
|---|---|---|---|---|---|---|---|---|
| 1 | 92.0 | 8.0 | 0 | 0.00 | 41 | $4.8 \times 10^{-4}$ | $1.9 \times 10^{-3}$ | $3.8 \times 10^{15}$ |
| 2 | 91.8 | 8.0 | 0.2 | 0.08 | 42 | $3.9 \times 10^{-4}$ | $6.7 \times 10^{-4}$ | $2.8 \times 10^{15}$ |
| 3 | 91.5 | 8.0 | 0.5 | 0.13 | 44 | $2.9 \times 10^{-4}$ | $4.1 \times 10^{-4}$ | $3.1 \times 10^{15}$ |
| 4 | 90.0 | 8.0 | 2.0 | 0.61 | 44 | $2.6 \times 10^{-4}$ | $3.7 \times 10^{-4}$ | $8.7 \times 10^{14}$ |
| 5 | 87.0 | 8.0 | 5.0 | 1.54 | 46 | $2.2 \times 10^{-4}$ | $3.8 \times 10^{-4}$ | $1.8 \times 10^{14}$ |
| 6 | 82.0 | 8.0 | 10.0 | 2.20 | 45 | $1.7 \times 10^{-4}$ | $3.7 \times 10^{-4}$ | $9.2 \times 10^{9}$ |
| 7 | 98.0 | 0 | 2.0 | 0.68 | 42 | $3.1 \times 10^{-4}$ | $7.3 \times 10^{-4}$ | $1.7 \times 10^{15}$ |

Note:
*1 AN: Acrylonitrile
MA: Methyl acrylate
SM: Sodium methallylsulfonate
*2 Content of sulfonic acid group in copolymer was determined by conductometric analysis.

EXAMPLE 11

A monomer mixture similar to that used in Example 10, Run No. 1, i.e., comprised of 92% acrylonitrile and 2% methyl acrylate was polymerized in the presence of potassium hydroxylaminesulfonate (A) and sodium bisulfite (B) by a suspension polymerization procedure under the following conditions.

| | |
|---|---|
| Water/total monomer ratio: | 4.5/1.0 |
| Amount of catalyst [(A)/(B)]: | 1.0%/4.0% based on the weight of total monomer |
| PH of polymerization mixture: | 2.5 (adjusted by $H_2SO_4$) |
| Polymerization temperature: | 55° C. |
| Polymerization period: | 4 hours |

The resultant copolymer contained 0.07% sulfonic acid group. By the same procedure as described in Example 9, a dried membrane was manufactured from the copolymer. The resultant membrane exhibited the following characteristics.

| | |
|---|---|
| Porosity: | 42% |
| Fragility: | 0 |
| Average pore size in surface layer: | 0.009 micron |
| Electrical resistance | |
| 20° C.: | $3.8 \times 10^{-4} \Omega dm^2/100$ micron |
| −15° C.: | $6.3 \times 10^{-4}$ |
| Insulation resistance: | $2.4 \times 10^{15} \Omega$. cm |

What we claim is:
1. A dried porous membrane composed of acrylonitrile polymer walls separating predominantly interconnecting small-size pores, which comprises surface layers integral with a support layer to form a single continuous acrylonitrile polymer phase, each of the surface layers having pores of from 0.001 to 0.05 micron in average size and a thickness of from 0.1 to 20 microns, the support layer having pores of a larger average size than the pores in the surface layers, and said membrane having a porosity of from 20% to 70% by volume and a fragility of below 30.

* * * * *